US011032305B2

(12) United States Patent
Chen

(10) Patent No.: US 11,032,305 B2
(45) Date of Patent: *Jun. 8, 2021

(54) MALWARE DETECTION SYSTEM ATTACK PREVENTION

(71) Applicant: Intel Corporation, Santa Clara, CA (US)

(72) Inventor: Li Chen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/727,500

(22) Filed: Dec. 26, 2019

(65) Prior Publication Data

US 2020/0137098 A1  Apr. 30, 2020

Related U.S. Application Data

(63) Continuation of application No. 16/421,044, filed on May 23, 2019, which is a continuation of application No. 15/634,685, filed on Jun. 27, 2017, now Pat. No. 10,333,961.

(51) Int. Cl.
*H04L 9/00* (2006.01)
*H04L 29/06* (2006.01)
*G06N 20/00* (2019.01)
*G06N 5/00* (2006.01)

(52) U.S. Cl.
CPC ......... *H04L 63/1425* (2013.01); *G06N 5/003* (2013.01); *G06N 20/00* (2019.01); *H04L 63/145* (2013.01); *H04L 63/1416* (2013.01)

(58) Field of Classification Search
CPC ............. H04L 63/1425; H04L 63/1416; H04L 63/145; G06N 5/03; G06N 20/00
See application file for complete search history.

(56) References Cited

U.S. PATENT DOCUMENTS

| 9,542,646 | B1 | 1/2017 | Baughman et al. |
| 10,139,823 | B2 | 11/2018 | Prokhorov et al. |
| 10,333,961 | B2 * | 6/2019 | Chen ...................... G06N 5/003 |

(Continued)

FOREIGN PATENT DOCUMENTS

| CN | 109145601 | 1/2019 |
| DE | 102018115266 | 12/2018 |

OTHER PUBLICATIONS

"U.S. Appl. No. 15/634,685, Notice of Allowance dated Feb. 13, 2019", 15 pgs.

(Continued)

*Primary Examiner* — Beemnet W Dada
(74) *Attorney, Agent, or Firm* — Schwegman Lundberg & Woessner, P.A.

(57) ABSTRACT

Systems and methods may be used to prevent attacks on a malware detection system. A method may include modeling a time series of directed graphs using incoming binary files during training of a machine learning system and detecting, during a time-window of the time series, an anomaly based on a directed graph of the time series of directed graphs. The method may include providing an alert that the anomaly has corrupted the machine learning system. The method may include preventing or remedying corruption of the machine learning system.

12 Claims, 6 Drawing Sheets

(56) References Cited

U.S. PATENT DOCUMENTS

2017/0083507 A1     3/2017   Ho et al.
2017/0132513 A1     5/2017   Yu et al.
2018/0129967 A1     5/2018   Herreshoff
2018/0349790 A1    12/2018   Cai et al.
2018/0375885 A1    12/2018   Chen

OTHER PUBLICATIONS

"U.S. Appl. No. 16/421,044, Preliminary Amendment filed Oct. 14, 2019", 7 pgs.

U.S. Appl. No. 15/634,685 U.S. Pat. No. 10,333,961, filed Jun. 27, 2017, Malware Detection System Attack Prevention.

U.S. Appl. No. 16/421,044, filed May 23, 2019, Malware Detection System Attack Prevention.

* cited by examiner

MALWARE DETECTION SYSTEM ATTACK PREVENTION

PRIORITY APPLICATION

This application is a continuation of U.S. application Ser. No. 16/421,044, filed May 23, 2019, which is a continuation of U.S. application Ser. No. 15/634,685, filed Jun. 27, 2017, now issued as U.S. Pat. No. 10,333,961, all of which are incorporated herein by reference in their entirety.

BACKGROUND

Malware attacks on systems throughout the world are prevalent and dangerous. Extortion, theft, and blackmail plague users of infected systems. As malware attacks become more sophisticated, increasingly complex techniques are being used to thwart the attackers. Machine learning techniques are one way to train systems to prevent malware attacks. Automated machine learning techniques have demonstrated powerfulness in malware detection. However, adversary malware attackers often attempt to poison malware training data, tricking the machine learning systems to produce incorrect models. This results in a degraded classification accuracy or high false positives, affecting the effectiveness of the machine learning systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
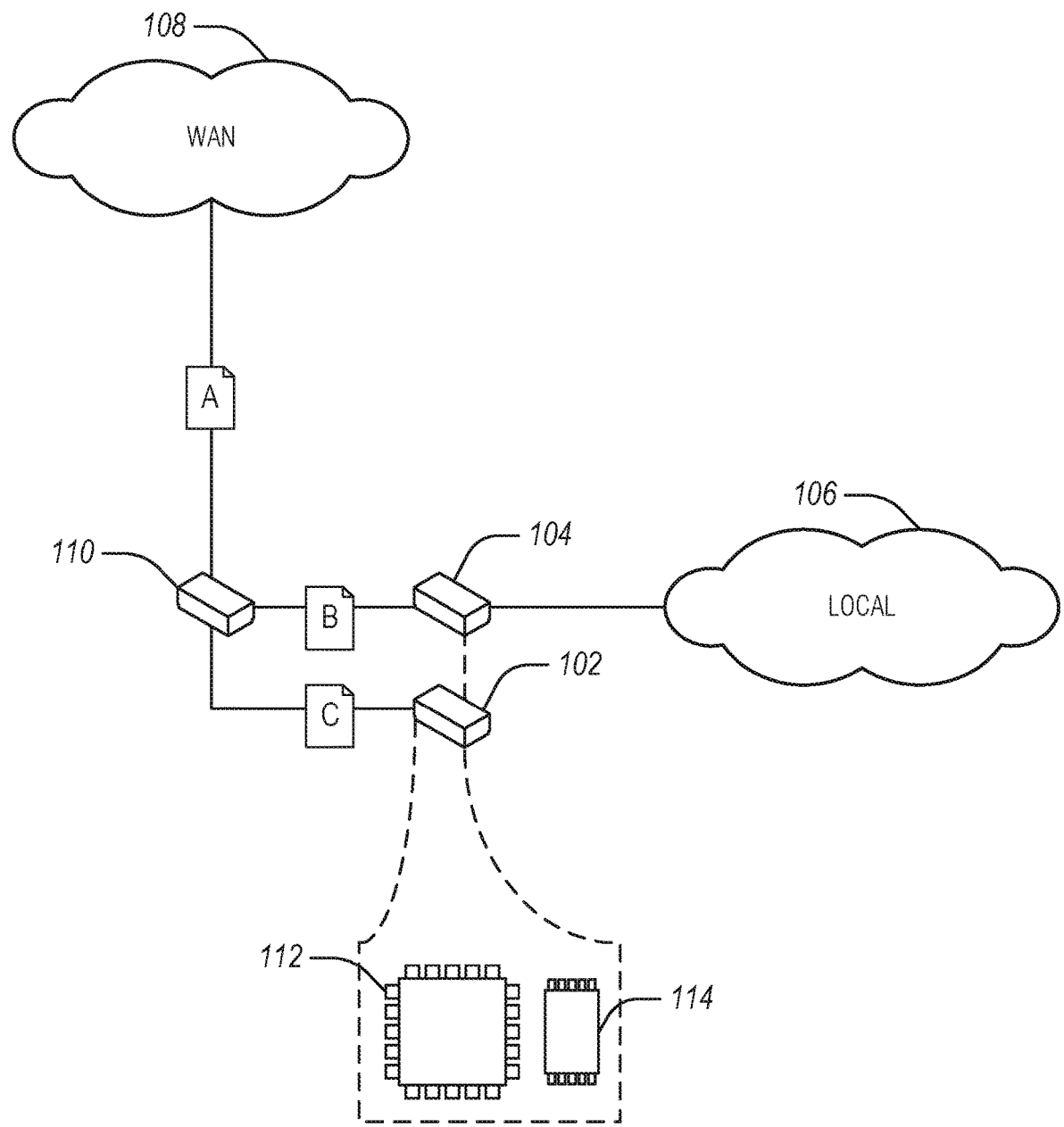
FIG. 1 illustrates a malware detection and alert system in accordance with some embodiments.

Systems and methods for preventing attacks on a malware detection system are described herein. The systems and methods described herein are used to allow machine learning systems used to detect malware to not be poisoned by malware attacks. Machine learning systems may be trained to prevent malware attacks. However, in adversarial machine learning, subtle attacks on the machine learning system, such as when it is training, may cause the machine learning system to accept certain malware attacks as normal, nonthreatening requests. For example, one type of attack involves slowly increasing the machine learning system's tolerance to abnormal attacks over a period of time.

An attacker may probe a machine learning system to attempt to determine what algorithm the machine learning system is running, what parameters are set in a machine learning system, or what actions may be permitted or rejected by the machine learning system. The attacker may find boundary decisions for the machine learning system in order to fit within the boundary to allow malware to pass through the machine learning system. The attack may be gradual with a slow change. The goal of the attacker is to trick the machine learning system into deciding that malware sent is actually benign.

The systems and methods described herein provide an alert system for malware detection systems to an attack on the malware detection system before there is a full scale attack launched. The alert system may work on top of the machine learning system. The alert system alerts the machine learning system to the attack during a probing time of the attacker. In response to the alert, the machine learning system may reject inputs from the attacking source, change the machine learning algorithm (make it more robust or enhance the robustness of the machine learning system), etc.

In an example, a malware attack on a machine learning system may include a causative attack, which makes the machine learning system tolerate more and more abnormal malware inputs. Eventually, after the machine learning system is tolerant enough, the malware attack includes launching a full-scale attack malicious files, which are not blocked by the machine learning system due to the tolerance. The systems and methods described herein use a novel alert system based on dynamic anomaly detection over time series of call graphs to prevent the attacks. The alert system detects when a data poisoning attack has occurred and alerts the machine learning system of the attack. The machine learning system may then adjust the machine learning model or block the causative attack, and prevent a full-scale attack.

The alert system described herein may use scan statistics by scanning over a neighborhood of vertices of a directed graph. For each time window selected during training of the machine learning system, the scan statistic may be checked, and if too high, the alert system may indicate the possibility of a poison attack, which may corrupt the machine learning system.

The alert system is designed to detect a time-window when an adversarial opponent starts to poison the training malware data, which may corrupt the machine learning system, and then provide an alert to the malware detection system to prevent the malware adversary from launching a full-scale attack. The alert system models incoming binary files as a time series of directed graphs. For example, the directed graph may be structured such that the vertices are functions and the edges are call relationships between the functions. In a dynamic setting, the alert system may calculate locality-statistics, scan over a small time window of incoming binaries, and derives scan statistics. The scan statistics may be used to perform change-point identification for dynamic anomaly detection. The alert system may provide calculations of different types of scan statistics, the selection of which may provide advantages for accurate detection depending on the structure of the binaries. In an example a type of scan statistics may be readily computable in a real-time streaming data environment. In another example, a type of scan statistics may be delayed (e.g., for a time-period). In an example, the alert system may achieve fast and accurate alert for data poisoning attacks, and inform the machine learning system so the learning model may be adjusted without being compromised.

FIG. 1 illustrates a malware detection system and alert system 100 in accordance with some embodiments. The malware detection system and alert system 100 includes a machine learning system 104 for malware detection and an alert system 102 including a processor 112 and memory 114. The malware detection system and alert system 100 uses the machine learning system 104 to detect malware from a wide area network (WAN) 108 (e.g., a network, the internet, etc.) incoming to a local network or machine 106.

A router 110 may send incoming data (e.g., a binary file or system call) to the machine learning system 104 or the alert system 102. In an example, the alert system 102 may receive the data before the machine learning system 104. In another example, the machine learning system 140 may forward the data to the alert system 102. In yet another example, the router 110 may send the data to both the machine learning system 104 and the alert system 102.

A call function or other incoming binary file, represented in FIG. 1 at different times as A, B, and C, may be sent from a remote address, router, or device via the WAN 108. The call function is first received by the router 110, and may be sent to the machine learning system 104 (B) or the alert system 102 (C). In an example, when sent along the path represented by B, the machine learning system 104 may send the call function to the alert system 102. The machine learning system 104 is used for malware detection to prevent malware from entering the local network or machine 106.

The alert system 102 may use change-point detection to determine whether the call functions received over a time period exhibit an indication of an attempt to poison the machine learning system 104, which may corrupt the machine learning system 104. Change-point detection may be used to identify anomalies in a dynamic setting. For example, the change-point detection may be incorporated into dynamic malware analysis by modeling incoming binaries as a time series of graphs, and using locality-based scan statistics to identify when a data poisoning attack has taken place or is taking place.

In a causative attack to attempt to break the machine learning system 104, the adversary aims at forcing the machine learning framework to learn a wrong model via gradually poisoning the training dataset, which may corrupt the machine learning system 104. Once the machine learning system 104 shifts a decision boundary and produces the wrong model, the adversary may launch a full-scale attack. The alert system 102 detects when the data pollution happens as it is happening, and alerts the machine learning system 104 about the causative attack, such that the machine learning system 104 may adjust its model in response. For example, one type of scan statistic implemented in the alert system 102 may be computationally inexpensive, which allows for fast anomaly detection in a real-time streaming data environment.

In an example, the alert system 102 may use domain expertise to enhance response to a causative attack. The alert system 102 may use a statistically-defined threshold to detect anomalies in a default setting. The domain expertise may allow for a user-defined threshold to leverage domain knowledge combined with automated anomaly detection to improve accuracy. The alert system 102 may identify new patterns of attack, such as from morphed malware. Specifically the alert system 102 may be used to predict emergence of subgroups including calling relationships between functions. While preventing malware attacks, the anomaly detection framework of the alert system 102 may also be used to gather intelligence on and pinpoint new families or types of malware.

Figure 2A:
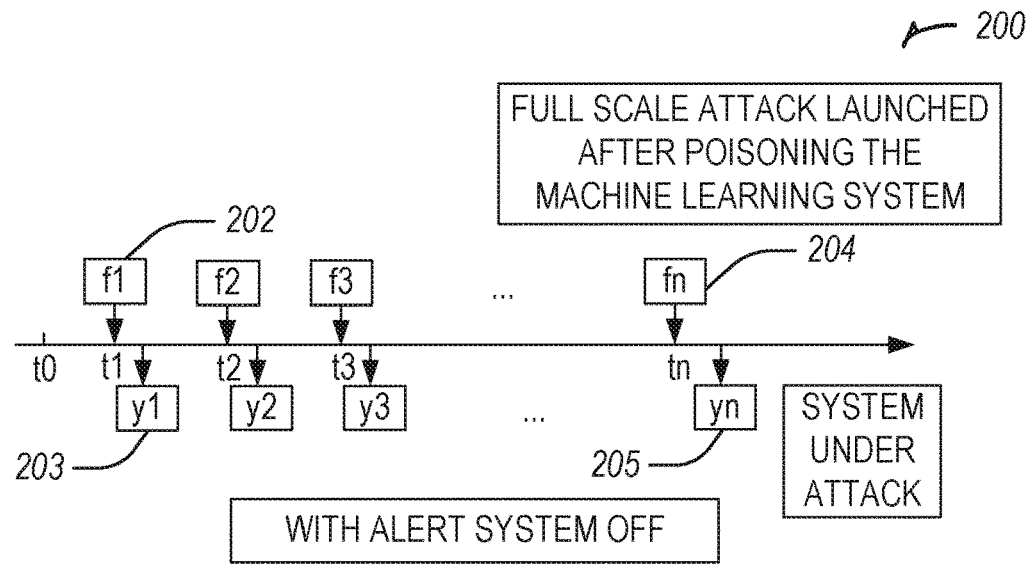
FIG. 2A illustrates a machine learning system without an alert system enabled in accordance with some embodiments.

FIG. 2A illustrates a machine learning system 200 without an alert system enabled in accordance with some embodiments. The machine learning system 200 without the alert system may be vulnerable to a full-scale attack launched after poisoning of boundary conditions of the machine learning system 200 has occurred. For example, the machine learning system 200 may receive a series of function calls (e.g., a first function $f_1$ 202 at time $t_1$) and train to detect malware attacks (e.g., by learning a training rule to add to a ruleset $y_1$ 203). Over time the function calls slowly increase the tolerance of the machine learning system 200 to malware attacks. Eventually, an attacker is able, for example at time $t_n$, with a function call $f_n$ 204 to attack, while the machine learning system allows the attack through, under the ruleset yn 205. In an example, a 1-bit input parameter R (for resilience) may be used to activate or deactivate the alert system. FIG. 2A illustrates the scenario when R=FALSE, i.e., the alert system is turned off. The machine learning mechanism in FIG. 2A is vulnerable to data poisoning attacks, which may corrupt the machine learning system.

Figure 2B:
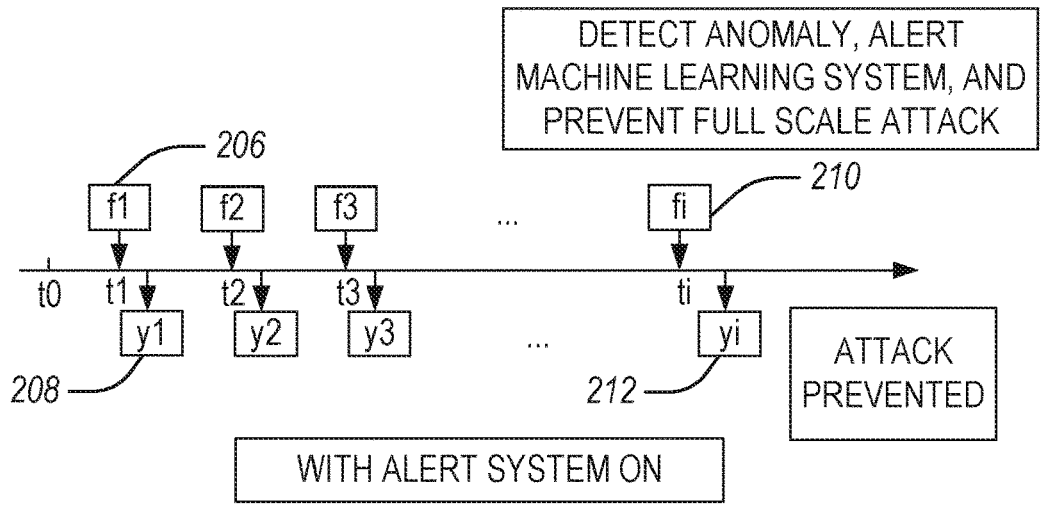
FIG. 2B illustrates the machine learning system with the alert system enabled in accordance with some embodiments.

FIG. 2B illustrates the machine learning system 200 with the alert system enabled in accordance with some embodiments. In FIG. 2B, illustrates the scenario when R=TRUE, and the alert system detects a data poisoning attack via anomaly detection. The alert system identifies a function call f1 206 at time t1 as a causative attack or potentially including a causative attack and alerts the machine learning system 200, which may modify the ruleset y1 208. At some later time ti, when a function call fi 210 attempts a full scale attack, the alert system may send an alert to the machine learning system 200 to prevent the attack. The machine learning system 200 may change or update the ruleset yi 212 to remedy the function call fi 210 attack attempt, or may reject or avoid the attack attempt altogether. The inputs of the alert system may include a time series of call graphs from the incoming function calls. In an example, the vertices of the call graph are the functions and the directed edges of the call graph are calling relationships between the functions.

Figure 3:
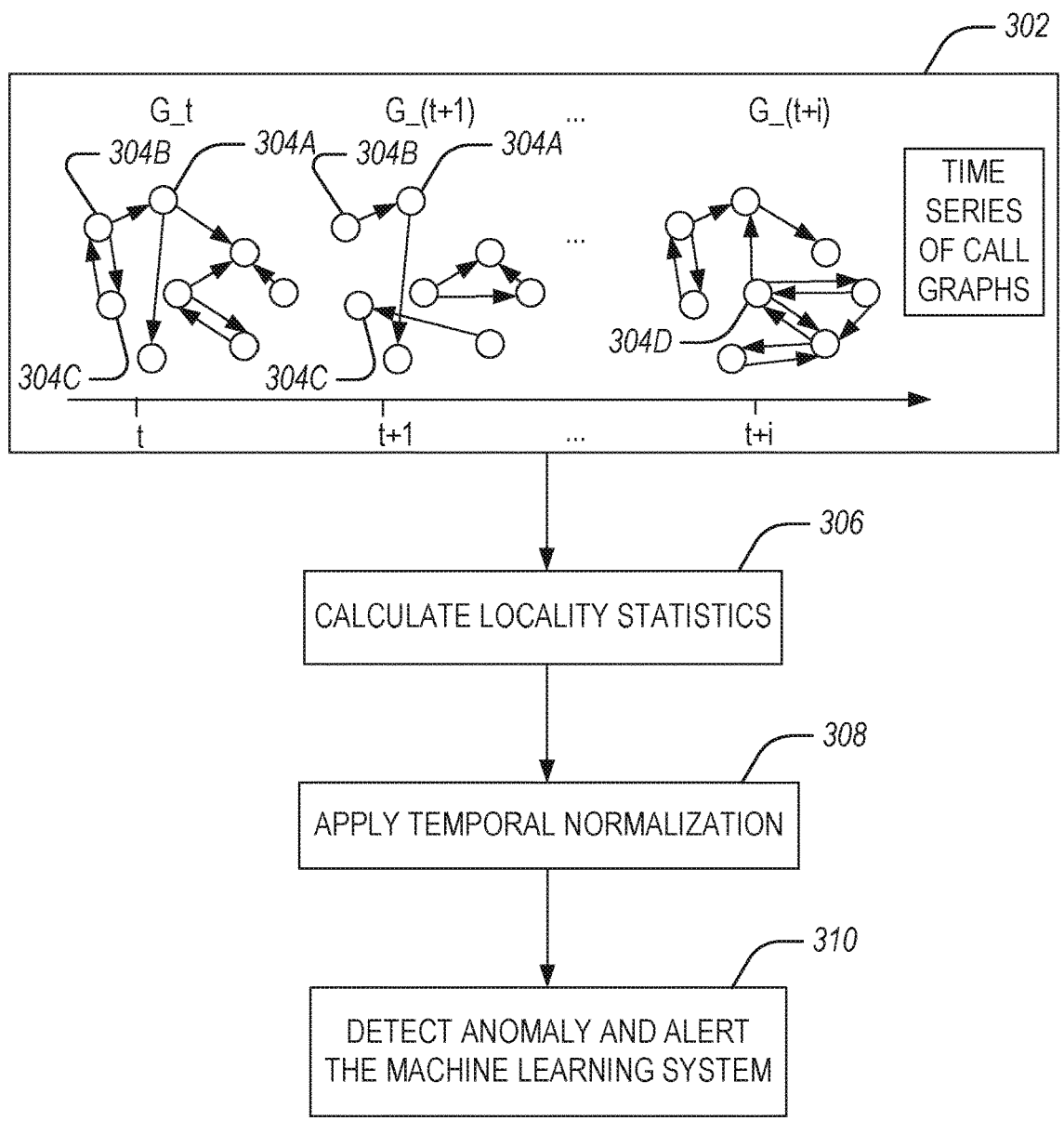
FIG. 3 illustrates a block diagram of an alert system for preventing data poisoning attacks in accordance with some embodiments.

FIG. 3 illustrates a flow chart illustrating a technique 300 performed by an alert system for preventing data poisoning attacks in accordance with some embodiments. The technique 300 includes an operation to model a time series of directed graphs of inputs to machine learning system at block 302. The time series (t, t+1, . . . t+i) shown in block 302 includes corresponding graphs (G_t, G_(t+1) . . . G_(t+i)) depicting functions as vertices and call relationships as edges. The graphs may have directed edges, such as those shown in block 302. For example, graph G_t illustrates vertices 304A-304C. The edges between the vertices include an edge from vertex 304B to vertex 304A, and edges in both directions between vertices 304B and 304C. No edges connect vertex 304A to vertex 304C. At time t+1, graph G(t+1) shows that the edge from vertex 304B to 304A is repeated, but the edges between vertices 304B and 304C are not present.

The technique 300 includes an operation to calculate locality statistics at block 306. An alert system may scan the series of graphs and calculate locality statistics for each time window based on subgraphs induced by respective neighborhoods of the functions (e.g., vertices) in the call graphs. In an example, the locality statistics may be calculated by determining a number of edges connected to a vertex. In another example, the locality statistics may be calculated by determining a number of edges connected to vertices connected to a vertex. For example, vertex 304C at time t is connected only to vertex 304B, which in turn further is connected only to vertex 304A. A locality statistic for a neighborhood one vertex away from vertex 304C includes vertex 304C (zero vertices away) and vertex 304B, one vertex away. The total count of edges in this scenario is 2 for vertex 304C, added to 3 for vertex 304B, for a total of 5. In an example, the total count of edges may be calculated for every vertex in a graph within a scan region or time. In the example at time t+i, graph G_(t+i) includes a vertex 304D, which is connected to three other vertices, and has a locality statistic for a neighborhood one vertex away of 5+3+3+5, for a total of 16. In another example, a neighborhood may include vertices two vertices away from a specified vertex, or three, four, etc.

The technique 300 includes an operation to apply temporal normalization at block 308. The temporal normalization is applied on the locality statistics to perform smoothing over the time series. For example, each locality statistic may be divided by a total number of edges of the directed graph at a specific time corresponding to the locality statistic. In another example, the locality statistic may be divided by an average number of edges of the directed graphs over some time window. In the examples shown in block 302, the locality statistic for vertex 304C at time t was 5, and for vertex 304D at time t+i was 16. Normalizing these numbers based on the number of edges of respective directed graphs changes the numbers to 5/9 and 16/12, respectively. The ratio of 16 to 5 is 3.2, whereas the ratio of 16/12 to 5/9 is 2.4. Normalizing the values allows the alert system to compare locality statistics at different times to determine if a value is an outlier. In an example, the scan statistics for a graph at a given time is the maximum of the normalized locality statistics.

The technique 300 includes an operation to detect an anomaly and alert the machine learning system at block 310. Large values of the normalized statistics indicate change-points within a time window (e.g., discrete moments or ranges of time within the time window). The change-points may be identified when a normalized statistic transgresses a threshold. For example, when the normalized statistic exceeds a predetermined threshold, an alert may be issued. The threshold may be determined by a separate machine learning system or technique, may be based on controlled or known malware attack normalized statistic values, or may be user-defined.

Figure 4:
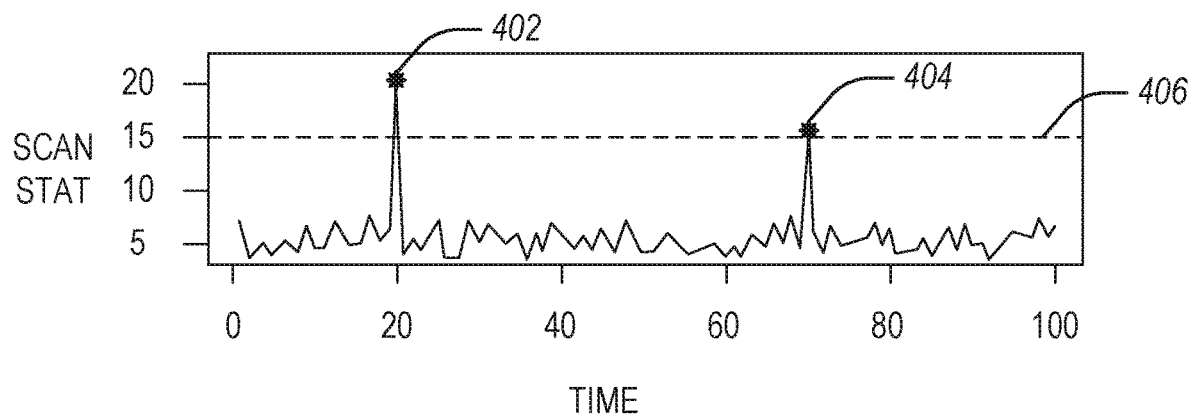
FIG. 4 illustrates a graph showing anomaly detection in accordance with some embodiments.

FIG. 4 illustrates a graph 400 showing anomaly detection, such as to prevent data poisoning of a machine learning system, in accordance with some embodiments. The graph 400 illustrates scan statistics of directed graphs over time. The scan statistics may include locality statistics as described herein and above, which may be normalized. For example, the graph 400 may be based on an incoming time series of executables. The incoming executables may be modeled as time series of call graphs, namely:

$$G_t, G_{t+1}, \ldots, G_{t+T} \qquad \text{Eq. 1}$$

An alert system may provide calculations of one of two scan statistics S defined as:

$$\Psi_{t;k(v)} = |E(\Omega(N_k(v; G_t); G_t))|; S_\Psi = \max_{v \in V} F(\Psi_{t;k(v)}) \qquad \text{Eq. 2}$$

$$\Phi_{t;t',k(v)} = |E(\Omega(N_k(v; G_t); G_{t'}))|; S_\Phi = \max_{v \in V} F(\Phi_{t;t',k(v)}) \qquad \text{Eq. 3}$$

Where $\Psi$ and $\Phi$ are the locality statistics in Eqs. 2 and 3, respectively, and S is the scan statistics in both equations. Either scan statistic may be used to generate graph 400. In Eq. 2, the locality statistics $\Psi_{t;k(v)}$ determines the number of edges in the subgraph of $G_t$ induced by $N_k(v; G_t)$, defined as the set of vertices at a distance at most k from the vertex v. $\Omega$ is the scan region. The scan statistics $S_\Psi$ is the maximum of the temporally normalized locality statistics $\Psi_{t;k(v)}$, where F denotes the temporal normalization function. In Eq. 3, the locality statistics $\Phi_{t;t',k(v)}$ determines the number of edges in the subgraphs of $G_{t'}$ induced by $N_k(v; G_t)$. The scan statistics $S_\Phi$ is the maximum of the temporally normalized locality statistics $\Phi_{t;t',k(v)}$. In an example, in a streaming environment, the alert system may use $\Psi_{t;k(v)}$, since it is readily computed in a real-time data environment. In another example, Eq. 3 may be used, such as when real-time alerting is not necessary. In an example, Eq. 3 represents scan statistics based on a directed graph from a previous time period t', which is before time t. For example, Eq. 3 may determine nearest neighbors from a current time t directed graph, while counting edges from a previous time t' directed graph. In an example, Eq. 3 may be more accurate than Eq. 2, which may offset the time delay inherent in Eq. 3 that is not in Eq. 2. The alert system may apply temporal normalization to the results of Eq. 2 or 3. The group of locality statistics for each time window (e.g., the results of Eq. 2 or 3) may include multiple values, such as a value for each vertex in a directed graph.

The alert system may retrieve a maximum value from the smoothed statistics at each time window (e.g., corresponding to the vertex with the highest normalized scan statistic). These maximum values may be plotted as graph 400. The graph 400 may be used to identify anomalies, such as anomaly 402 and 404, which may cause the alert system to issue an alert to the machine learning system. The anomalies 402 or 404 may be detected, for example, by comparing the maximum values plotted in graph 400 to a threshold, for example shown in graph 400 at scan statistic value 406. In another example, instead of a maximum value, an average or a weighted average, such as a weighted geometric average may be used to determine a combined scan statistic for a particular directed graph. In this example, the combined scan statistic may be plotted over time to arrive at graph 400.

Figure 5:
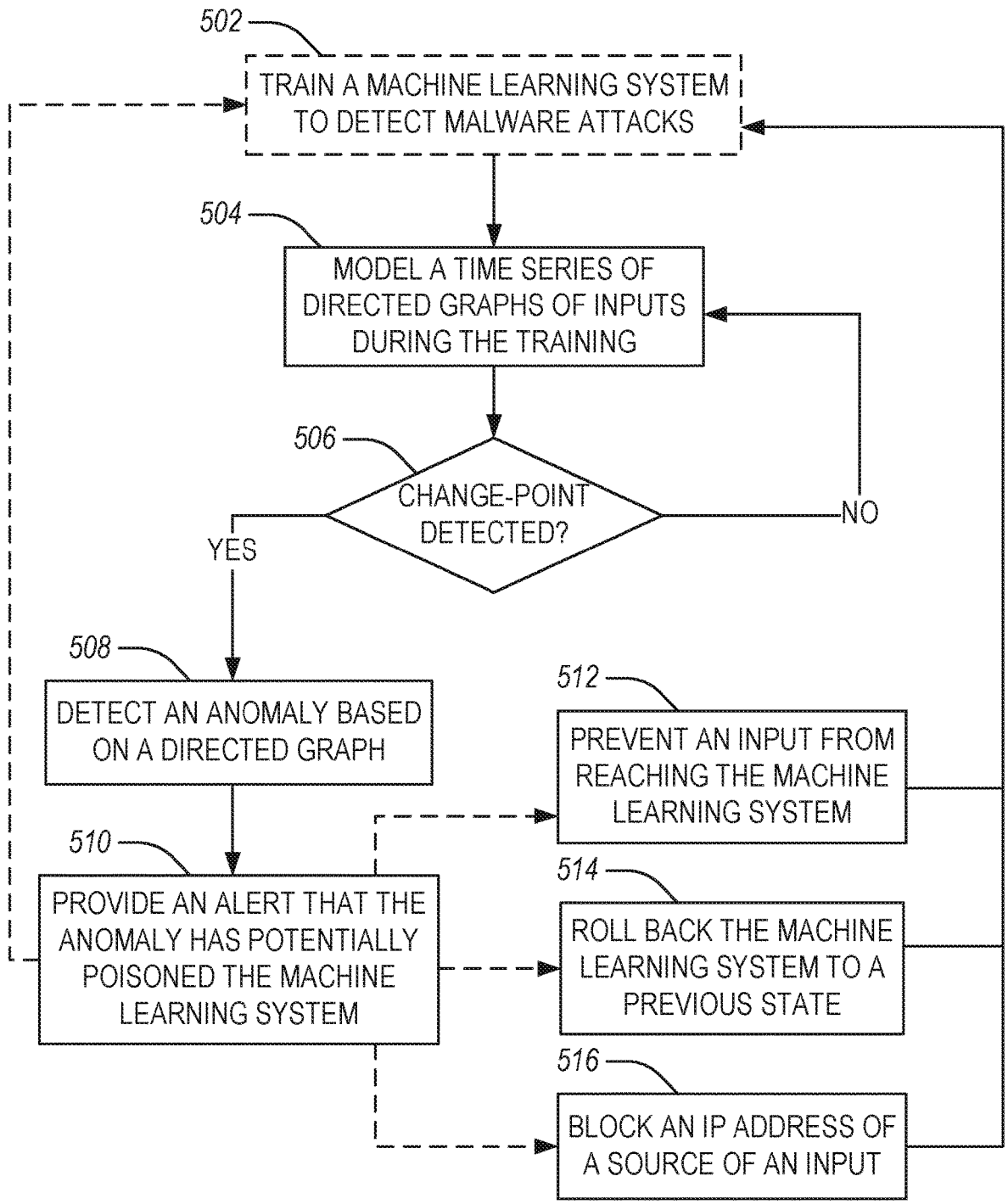
FIG. 5 illustrates a flowchart showing a technique for preventing attacks on a malware detection system in accordance with some embodiments.

FIG. 5 illustrates a flowchart showing a technique 500 for preventing attacks on a malware detection system in accordance with some embodiments. The technique 500 includes an optional operation 502 to train a machine learning system to detect malware attacks. The technique 500 includes an operation 504 to model a time series of directed graphs of inputs during the training, for example using incoming binary files. The binary files may include call functions. In an example, vertices of the directed graph are functions and an edge of the directed graph is a call relationship between functions of respective vertices connected by the edge. In another example, the directed graphs are call graphs.

The technique 500 includes a decision operation 506 to determine whether a change-point is detected. When the change-point is not detected, the technique 500 may continue to monitor inputs to the machine learning system for change-points by returning to operation 504. When the change-point is detected, the technique 500 includes an operation 508 to detect an anomaly based on a directed graph, for example during a time-window of the time series. In response to detecting the anomaly, the technique may include an operation 510 to provide an alert that the anomaly has poisoned or potentially poisoned the machine learning system. Operation 510 may send the alert to the machine learning system, which may adjust, stop, or change the malware detection. For example, operation 502 may be restarted, adjusted, changed, stopped, or the like. Providing the alert may include preventing one or more of the binary files from reaching the machine learning system. In an example, providing the alert includes blocking an IP address of a source of one or more of the binary files. In another example, providing the alert may include rolling back the machine learning system to a previous state before a first detected anomaly. For example, providing the alert may include indicating a moment in time, or a previous saved state of the machine learning system to roll back to. In another example, the technique 500 may further include preventing at least one of the binary files from reaching the machine learning system, blocking an IP address of a source of at least one of the binary files, or causing the machine learning system o perform a roll back to a previous state before a first detected anomaly.

In an example, the directed graph corresponds to the time-window. In another example, the directed graph corresponds to a previous time-window that occurred before the time-window. In an example, the technique 500 may include, in response to detecting the anomaly, an operation 512 to prevent an input from reaching the machine learning system. In an example, the technique 500 may include, in response to detecting the anomaly, an operation 514 to roll back the machine learning system to a previous state. In an example, the technique 500 may include, in response to detecting the anomaly, an operation 516 to block an IP address of a source of an input. After any of operations 512-516, the technique 500 may include returning to operation 502 for further training.

In an example, detecting the anomaly may include deriving scan statistics for a plurality of subgraphs of the directed graph, the plurality of subgraphs including respective vertices a number of connected edges away from each particular vertex in the directed graph. The change-point of the scan statistics may be detected over the time-window or over a previous time window. In an example, the change-point represents the anomaly and corresponding to a value of a scan statistic of the scan statistics that is above a threshold. In an example, the scan statistic includes a count, such as a maximum of the number of connected edges of a subgraph of the plurality of subgraphs over the time-window, and wherein the number of connected edges away from a particular vertex of the subgraph includes a set of k-nearest neighbors' vertices from the particular vertex. In another example, the scan statistic includes a count, such as a maximum of the number of connected edges of a subgraph of the plurality of subgraphs over a previous time-window. In yet another example, the scan statistic includes a weighted geometric average of locality statistics derived over the time-window and a scan statistic derived over a previous time-window. Deriving the scan statistic may include performing temporal normalization on the scan statistics to smooth the scan statistics over the time-window or over the previous time-window.

Figure 6:
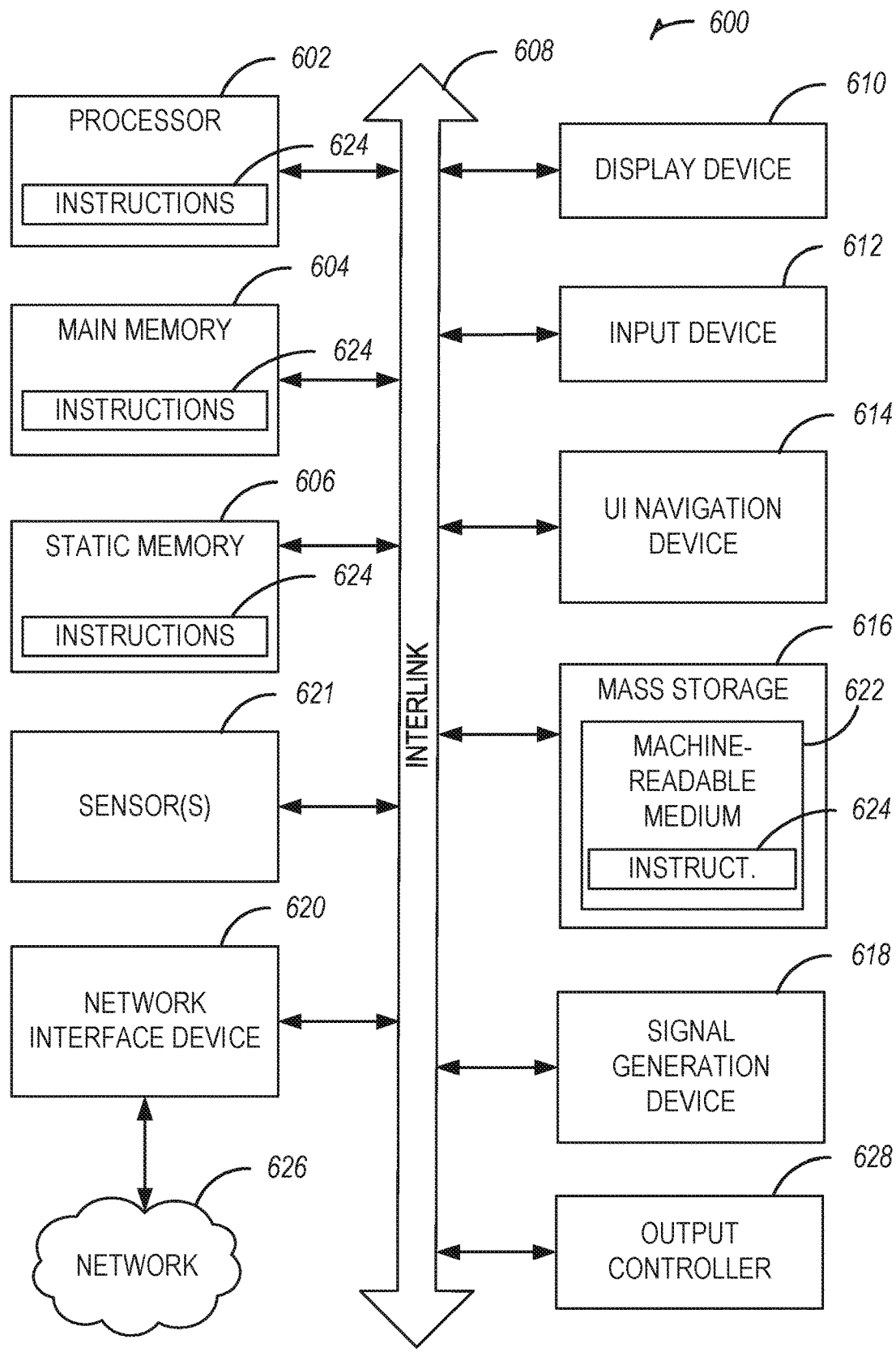
FIG. 6 illustrates generally an example of a block diagram of a machine upon which any one or more of the techniques (e.g., methodologies) discussed herein may perform in accordance with some embodiments.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internee protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

VARIOUS NOTES AND EXAMPLES

Each of these non-limiting examples may stand on its own, or may be combined in various permutations or combinations with one or more of the other examples.

Example 1 is a method for preventing attacks on a malware detection system, the method comprising: modeling a time series of directed graphs using incoming binary files during training of a machine learning system to detect malware attacks; detecting, during a time-window of the time series, an anomaly based on a directed graph of the time series of directed graphs; and providing an alert that the anomaly has corrupted the machine learning system.

In Example 2, the subject matter of Example 1 includes, wherein vertices of the directed graph are functions corresponding to the incoming binary files and an edge of the directed graph is a call relationship between functions of respective vertices connected by the edge.

In Example 3, the subject matter of Examples 1-2 includes, wherein the directed graph corresponds to the time-window.

In Example 4, the subject matter of Examples 1-3 includes, wherein the directed graph corresponds to a previous time-window that occurred before the time-window.

In Example 5, the subject matter of Examples 1-4 includes, wherein detecting the anomaly includes: deriving scan statistics for a plurality of subgraphs of the directed graph, the plurality of subgraphs including respective vertices a number of connected edges away from a particular vertex in the directed graph; and detecting a change-point of the scan statistics within the time-window, the change-point representing the anomaly and corresponding to a value of a scan statistic of the scan statistics that is above a threshold.

In Example 6, the subject matter of Example 5 includes, wherein the scan statistic includes a count of a maximum of the number of connected edges of a subgraph of the plurality of subgraphs over the time-window, and wherein the number of connected edges away from a particular vertex of the subgraph includes a set of k-nearest neighbors vertices from the particular vertex.

In Example 7, the subject matter of Examples 5-6 includes, wherein the scan statistic includes a count of a maximum of the number of connected edges of a subgraph of the plurality of subgraphs over a previous time-window.

In Example 8, the subject matter of Examples 5-7 includes, wherein the scan statistic includes a weighted geometric average of locality statistics derived over the time-window and a scan statistic derived over a previous time-window.

In Example 9, the subject matter of Examples 5-8 includes, wherein deriving the scan statistics includes performing temporal normalization on the scan statistics to smooth the scan statistics over the time-window.

In Example 10, the subject matter of Examples 1-9 includes, wherein the directed graphs are call graphs.

In Example 11, the subject matter of Examples 1-10 includes, preventing at least one of the binary files from reaching the machine learning system.

In Example 12, the subject matter of Examples 1-11 includes, blocking an IP address of a source of at least one of the binary files.

In Example 13, the subject matter of Examples 1-12 includes, causing the machine learning system to perform a roll back to a previous state before a first detected anomaly.

Example 14 is at least one machine-readable medium including instructions for operation of a computing system, which when executed by a machine, cause the machine to perform operations of any of the methods of Examples 1-13.

Example 15 is an apparatus comprising means for performing any of the methods of Examples 1-13.

Example 16 is a malware detection system for preventing poison attacks, the malware detection system comprising: an anomaly detection system to: model a time series of directed graphs using incoming binary files during training of a machine learning system to detect malware attacks; detect, during a time-window of the time series, an anomaly based on a directed graph of the time series of directed graphs; and provide an alert that the anomaly has corrupted the machine learning system.

In Example 17, the subject matter of Example 16 includes, wherein vertices of the directed graph are functions corresponding to the incoming binary files and an edge of the directed graph is a call relationship between functions of respective vertices connected by the edge.

In Example 18, the subject matter of Examples 16-17 includes, wherein the directed graph corresponds to the time-window.

In Example 19, the subject matter of Examples 16-48 includes, wherein the directed graph corresponds to a previous time-window that occurred before the time-window.

In Example 20, the subject matter of Examples 16-19 includes, wherein to detect the anomaly, the anomaly detection system is to: derive scan statistics for a plurality of subgraphs of the directed graph, the plurality of subgraphs including respective vertices a number of connected edges away from a particular vertex in the directed graph; and detect a change-point of the scan statistics within the time-window, the change-point representing the anomaly and corresponding to a value of a scan statistic of the scan statistics that is above a threshold.

In Example 21, the subject matter of Example 20 includes, wherein the scan statistic includes a count of a maximum of the number of connected edges of a subgraph of the plurality of subgraphs over the time-window, and wherein the number of connected edges away from a particular vertex of the subgraph includes a set of k-nearest neighbors vertices from the particular vertex.

In Example 22, the subject matter of Examples 20-21 includes, wherein the scan statistic includes a count of a maximum of the number of connected edges of a subgraph of the plurality of subgraphs over a previous time-window.

In Example 23, the subject matter of Examples 20-22 includes, wherein the scan statistic includes a weighted geometric average of locality statistics derived over the time-window and a scan statistic derived over a previous time-window.

In Example 24, the subject matter of Examples 20-23 includes, wherein to derive the scan statistics, the anomaly detection system is to perform temporal normalization on the scan statistics to smooth the scan statistics over the time-window.

In Example 25, the subject matter of Examples 16-24 includes, wherein the directed graphs are call graphs.

In Example 26, the subject matter of Examples 16-25 includes, wherein the anomaly detection system is further to prevent at least one of the binary files from reaching the machine learning system.

In Example 27, the subject matter of Examples 16-26 includes, wherein the anomaly detection system is further to block an IP address of a source of at least one of the binary files.

In Example 28, the subject matter of Examples 16-27 includes, wherein the anomaly detection system is further cause the machine learning system to perform to roll back to a previous state before a first detected anomaly.

Example 29 is at least one machine-readable medium including instructions for preventing attacks on a malware detection system, which when executed by a machine, cause the machine to: model a time series of directed graphs using incoming binary files during training of a machine learning system to detect malware attacks; detect, during a time-window of the time series, an anomaly based on a directed graph of the time series of directed graphs; and provide an alert that the anomaly has corrupted the machine learning system.

In Example 30, the subject matter of Example 29 includes, wherein vertices of the directed graph are functions corresponding to the incoming binary files and an edge of the directed graph is a call relationship between functions of respective vertices connected by the edge.

In Example 31, the subject matter of Examples 29-30 includes, wherein directed graph corresponds to the time-window.

In Example 32, the subject matter of Examples 29-31 includes, wherein the directed graph corresponds to a previous time-window that occurred before the time-window.

In Example 33, the subject matter of Examples 29-32 includes, wherein detecting the anomaly includes: deriving scan statistics for a plurality of subgraphs of the directed graph, the plurality of subgraphs including respective vertices a number of connected edges away from a particular vertex in the directed graph; and detecting a change-point of the scan statistics within the time-window, the change-point representing the anomaly and corresponding to a value of a scan statistic of the scan statistics that is above a threshold.

In Example 34, the subject matter of Example 33 includes, wherein the scan statistic includes a count of a maximum of the number of connected edges of a subgraph of the plurality of subgraphs over the time-window, and wherein the number of connected edges away from a particular vertex of the subgraph includes a set of k-nearest neighbors vertices from the particular vertex.

In Example 35, the subject matter of Examples 33-34 includes, wherein the scan statistic includes a count of a maximum of the number of connected edges of a subgraph of the plurality of subgraphs over a previous time-window.

In Example 36, the subject matter of Examples 33-35 includes, wherein the scan statistic includes a weighted geometric average of locality statistics derived over the time-window and a scan statistic derived over a previous time-window.

In Example 37, the subject matter of Examples 33-36 includes, wherein deriving the scan statistics includes performing temporal normalization on the scan statistics to smooth the scan statistics over the time-window.

In Example 38, the subject matter of Examples 29-37 includes, wherein the directed graphs are call graphs.

In Example 39, the subject matter of Examples 29-38 includes, instructions to prevent at least one of the binary files from reaching the machine learning system.

In Example 40, the subject matter of Examples 29-39 includes, instructions to block an IP address of a source of at least one of the binary files.

In Example 41, the subject matter of Examples 29-40 includes, instructions to cause the machine learning system to perform a roll back to a previous state before a first detected anomaly.

Example 42 is an apparatus for preventing attacks on a malware detection system, the apparatus comprising: means for modeling a time series of directed graphs using incoming binary files during training of a machine learning system to detect malware attacks; means for detecting, during a time-window of the time series, an anomaly based on a directed graph of the time series of directed graphs; and means for providing an alert that the anomaly has corrupted the machine learning system.

In Example 43, the subject matter of Example 42 includes, wherein vertices of the directed graph are functions corresponding to the incoming binary files and an edge of the directed graph is a call relationship between functions of respective vertices connected by the edge.

In Example 44, the subject matter of Examples 42-43 includes, wherein the directed graph corresponds to the time-window.

In Example 45, the subject matter of Examples 42-44 includes, wherein the directed graph corresponds to a previous time-window that occurred before the time-window.

In Example 46, the subject matter of Examples 42-45 includes, wherein the means for detecting the anomaly include: means for deriving scan statistics for a plurality of subgraphs of the directed graph, the plurality of subgraphs including respective vertices a number of connected edges away from a particular vertex in the directed graph; and means for detecting a change-point of the scan statistics within the time-window, the change-point representing the anomaly and corresponding to a value of a scan statistic of the scan statistics that is above a threshold.

In Example 47, the subject matter of Example 46 includes, wherein the scan statistic includes a count of a maximum of the number of connected edges of a subgraph of the plurality of subgraphs over the time-window, and wherein the number of connected edges away from a particular vertex of the subgraph includes a set of k-nearest neighbors vertices from the particular vertex.

In Example 48, the subject matter of Examples 46-47 includes, wherein the scan statistic includes a count of a maximum of the number of connected edges of a subgraph of the plurality of subgraphs over a previous time-window.

In Example 49, the subject matter of Examples 46-48 includes, wherein the scan statistic includes a weighted geometric average of locality statistics derived over the time-window and a scan statistic derived over a previous time-window.

In Example 50, the subject matter of Examples 46-49 includes, wherein the means for deriving the scan statistics include means for performing temporal normalization on the scan statistics to smooth the scan statistics over the time-window.

In Example 51, the subject matter of Examples 42-50 includes, wherein directed graphs are call graphs.

In Example 52, the subject matter of Examples 42-51 includes, means for preventing at least one of the binary files from reaching the machine learning system.

In Example 53, the subject matter of Examples 42-52 includes, means for blocking an IP address of a source of at least one of the binary files.

In Example 54, the subject matter of Examples 42-53 includes, means for causing the machine learning system to perform a roll back to a previous state before a first detected anomaly.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

Example 55 is at least one machine-readable medium including instructions, which when executed by a machine, cause the machine to perform operations of any of the operations of Examples 1-54.

Example 56 is an apparatus comprising means for performing any of the operations of Examples 1-54.

Example 57 is a system to perform the operations of any of the Examples 1-54.

Example 58 is a method to perform the operations of any of the Examples 1-54.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A malware detection system, the malware detection system comprising:
   a processor; and
   memory, the memory including instructions, which when executed by the processor, cause the processor to:
   construct a time series of directed graphs using incoming files, during training of a machine learning system used to detect malware attacks, wherein a structure of the time series of directed graphs is based on relationships between entities recorded in the incoming files;
   detect, during a time window of the time series, an anomaly based on the time series of directed graphs; and
   provide an indication that the anomaly was detected.

2. The malware detection system of claim 1, wherein the incoming files describe activity of malware.

3. The malware detection system of claim 1, wherein to detect malware attacks, the instructions cause the processor to recognize statistical relationships of activities of malware.

4. The malware detection system of claim 1, wherein vertices in the structure of the directed graph represents an executable component.

5. A method for implementing a malware detection system, the method comprising:
   constructing a time series of directed graphs using incoming files, during training of a machine learning system used to detect malware attacks, wherein a structure of the time series of directed graphs is based on relationships between entities recorded in the incoming files;
   detecting, during a time window of the time series, an anomaly based on the time series of directed graphs; and
   providing an indication that the anomaly was detected.

6. The method of claim 5, wherein the incoming files describe activity of malware.

7. The method of claim 5, wherein detecting malware attacks comprises recognizing statistical relationships of activities of malware.

8. The method of claim 5, wherein vertices in the structure of the directed graph represents an executable component.

9. At least one non-transitory machine-readable medium including instructions for preventing attacks on a malware detection system, which when executed by a machine, cause the machine to:
   construct a time series of directed graphs using incoming files, during training of a machine learning system used to detect malware attacks, wherein a structure of the time series of directed graphs is based on relationships between entities recorded in the incoming files;

detect, during a time window of the time series, an anomaly based on the time series of directed graphs; and provide an indication that the anomaly was detected.

10. The at least one non-transitory machine-readable medium of claim 9, wherein the incoming files describe activity of malware.

11. The at least one non-transitory machine-readable medium of claim 9, wherein the instructions to detect malware attacks comprise instructions to recognize statistical relationships of activities of malware.

12. The at least one non-transitory machine-readable medium of claim 9, wherein vertices in the structure of the directed graph represents an executable component.

* * * * *